(12) United States Patent
Kim

(10) Patent No.: US 6,258,478 B1
(45) Date of Patent: Jul. 10, 2001

(54) ELECTRODE ASSEMBLY HAVING A RELIABLE CAPACITY RATIO BETWEEN NEGATIVE AND POSITIVE ACTIVE MATERIALS AND BATTERY HAVING THE SAME

(75) Inventor: Chang Seob Kim, Chonan-shi (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/139,554

(22) Filed: Aug. 25, 1998

(30) Foreign Application Priority Data

Jan. 22, 1998 (KR) ................................... 98-1884

(51) Int. Cl.[7] ................................................ H01M 10/34
(52) U.S. Cl. .......................... 429/60; 429/94; 429/164; 429/209; 429/233
(58) Field of Search ........................... 429/60, 129, 133, 429/94, 233, 164, 209

(56) References Cited

U.S. PATENT DOCUMENTS

| | | | |
|---|---|---|---|
| 5,032,475 | * 7/1991 | Hasebe et al. | 429/60 |
| 5,541,017 | * 7/1996 | Hong et al. | 429/59 |
| 5,683,834 | * 11/1997 | Fujimoto et al. | 429/94 |
| 5,824,156 | * 10/1998 | Watanabe et al. | 118/410 |
| 5,849,430 | * 12/1998 | Lee | 429/94 |

FOREIGN PATENT DOCUMENTS 3-236173 * 10/1991 (JP) .

* cited by examiner

Primary Examiner—Laura Weiner
(74) Attorney, Agent, or Firm—Baker & McKenzie

(57) ABSTRACT

A roll electrode assembly used in a secondary battery includes a positive electrode applied with a positive active material, a negative electrode applied with a negative active material, and a separator disposed between said positive and negative electrodes. A thickness of the positive or negative active materials applied on opposite sides of positive or negative substrates of the positive or negative electrodes are different from each other such that the capacity ratio between the positive and negative electrodes can be maintained above 1.

6 Claims, 5 Drawing Sheets

ELECTRODE ASSEMBLY HAVING A RELIABLE CAPACITY RATIO BETWEEN NEGATIVE AND POSITIVE ACTIVE MATERIALS AND BATTERY HAVING THE SAME

BACKGROUNDS OF THE INVENTION

1. Field of the Invention

The present invention relates to a secondary battery. More particularly, this invention relates to a secondary battery having electrode assembly in which the capacity ratio between negative and positive active materials is reliably maintained to improve the battery performance and safety.

2. Description of the Prior Art

Generally, a secondary battery includes a roll electrode assembly having positive and negative electrodes applied with active materials and a separator disposed between the positive and negative electrodes; and a can in which the roll electrode assembly is inserted with the electrolyte. The secondary battery is a rechargeable battery using physical and chemical reactions between molecules of electrolyte and active materials. In recent years, the secondary battery has been widely used for portable products due to its compact in size and large capacity.

The secondary batteries are classified into a nickel-cadmium, nickel-metal hydride, and lithium ion batteries depend on materials used as the positive and negative electrodes or the electrolyte, and are further classified according to their shape into cylindrical, package and prism types.

Especially, the prism type secondary battery comprises a roll electrode assembly consisting of a positive electrode, a negative electrode, and a separator disposed between the positive and negative electrodes; a can in which the electrode assembly is inserted with the negative electrode contacted therewith; and a cap assembly coupled to the positive electrode of the electrode assembly. Internal insulating plates are provided at upper and lower ends of the electrode assembly to prevent the electrode assembly from contacting the cap assembly and the can. The cap assembly is provided with a negative plate which is welded to the upper end of the can, a positive plate formed on a central portion of the cap assembly, and an external insulating plate disposed between the negative and positive plates. The positive plate contacts the positive electrode of the electrode assembly by a tap and supported by a rivet passing through the negative and positive plates. An insulating gasket is disposed between the rivet and the negative plate.

In the above described conventional prism type secondary battery, the positive and negative electrodes (hereafter referred as electrode) are manufactured through multiple steps. That is, active material is first applied on opposite surfaces of an electrode substrate at a predetermined thickness. Then, the electrode substrate applied with the active material is dried and pressed, thereby obtaining the electrode. The active material allows the absorption and release of the electrons or ions to generate or retain electromotive force.

In the secondary battery, the capacity ratio of the negative active material with respect to the positive active material ("N/P ratio") is usually at about 1.2 to 1.4 in order to obtain a reserve by which positive ions generated from the positive electrode can be absorbed into the negative electrode during charge and discharge. For example, if the N/P ratio is less than 1, a metal oxide is extracted or the electrolyte leaks. This results in the deterioration of the charge and discharge ability of the secondary battery, and even in the explosion of the secondary battery by the increase of the internal pressure of the battery.

Referring to FIG. 6, there is shown a sectional view of a conventional roll electrode assembly 100. The roll electrode assembly 100 is substantially oval having straight parts St and curve parts L. The roll electrode assembly comprises a positive electrode 100b applied with a positive active material, a negative electrode applied with a negative active material, and a separator 102 disposed between the positive and the negative electrodes 100b and 100a.

At the straight parts St of the assembly 100, the capacity of the positive active material of the positive electrode 100b is the same as that of the negative active material of the negative electrode 100a as the length of the positive electrode 100b is equal to that of the negative electrode 100a. However, at the curve parts L of the assembly 100, as shown in FIG. 7, the capacity of the positive active material of the positive electrode 100b is different from that of the negative active material of the negative electrode 100a as the length of the positive electrode 100b differs from that of the negative electrode 100a.

Describing more in detail with reference to FIGS. 7 and 8, each circumference length $S_n$ of the positive and negative electrodes at the curve parts is as follows:

$$S_n = \theta * R_n$$

Where, $\theta$ is an angle between a first line radially extending from a center point of the curved portion and a second line radially extending from the center point; and $R_n$ is a straight distance from the center point to each electrode (n indicates the turn order of the positive and negative electrodes).

Therefore the difference of the circumference length between two adjacent electrodes becomes as follows:

$$S_n - S_{n-1} = (\theta * R_n) - (\theta * R_{n-1})$$

In addition, when the thickness of the positive and negative active materials of the two adjacent electrodes is T, since T is equal to a distance between the adjacent electrodes, the difference of circumference length of two adjacent electrodes becomes as follows:

$$S_n - S_{n-1} = (\theta * R_n) - (\theta * R_{n-1}) = \theta(R_{n-1} + T) - \theta R_{n-1} = \theta T$$

And, the difference of the capacity of the two adjacent electrodes becomes as follows:

$\theta T * T *$ the vertical axis length of the electrode

Accordingly, in the conventional secondary battery, as shown in FIG. 9(A), when the negative electrode is located at the outermost of the roll electrode assembly, the N/P ratio will be maintained more than 1.

However, as shown in FIG. 9(B), when the positive electrode is located at the outermost of the roll electrode assembly, there may be a zone where the N/P ratio becomes less than 1. This zone increases the potential for an extraction of a metal oxide during the charge and discharge of the prism type secondary battery, resulting in the deterioration of the performance of the battery. Especially, when the battery is charged and discharged at a high ratio, this causes the deterioration of the battery safety.

SUMMARY OF THE INVENTION

Therefore, the present invention as been made in an effort to solve the above described drawbacks of the prior art.

It is an object of the present invention to provide a battery wherein the N/P ratio can be maintained above 1 throughout the any area of the electrode assembly.

To achieve the above object, the present invention provides a roll electrode assembly used in a secondary battery comprising a positive electrode applied with a positive active material, a negative electrode applied with a negative active material, and a separator disposed between said positive and negative electrodes. Thicknesses of the positive or negative active materials applied on opposite sides of the positive or negative substrates of the positive or negative electrodes are different from each other such that the capacity ratio between the positive and negative electrodes can be maintained above 1.

Preferably, the thickness of the active material applied on an outer side of the negative substrate is thicker than the thickness of the active material applied on an inner side of the negative substrate. The thickness difference is within 10 to 50%.

Alternatively, the thickness of the active material applied on the negative substrate is varied along the length of the negative substrate.

Preferably, the thickness of the active material applied on an inner surface of the positive substrate is designed to be less than T/2 and the thickness of the active material applied on an outer surface of the positive electrode is designed to be equal to T/2.

The thickness of the active material applied on any one side of all turns of the positive and negative electrodes are the same in any position of the electrode. The ratio between the negative active material and the positive active material is more than 1 through the all turns of the electrodes.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF PREFERRED EMBODIMENTS

Figure 1:
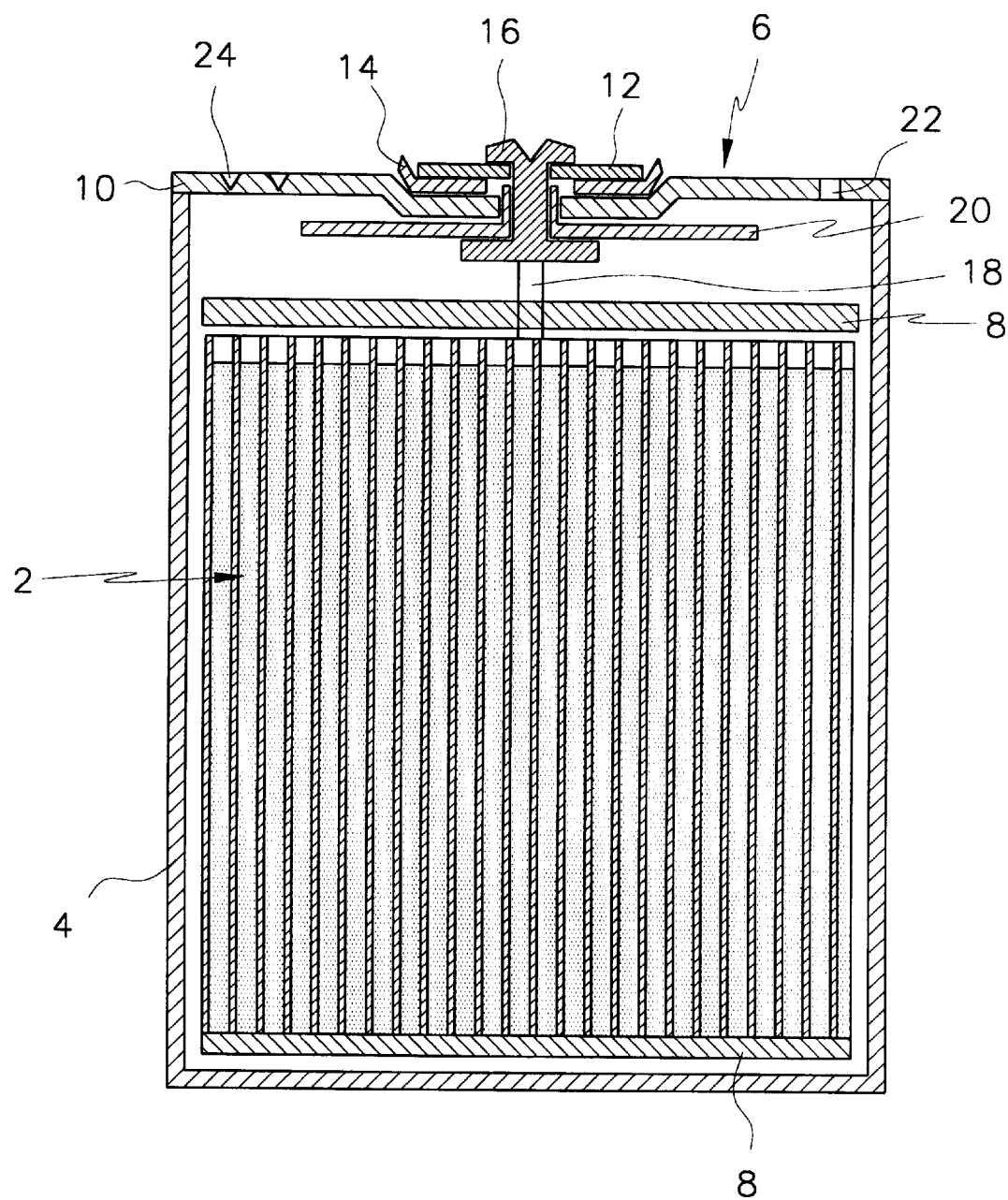
FIG. 1 is a cross sectional view illustrating a prism secondary battery where a roll electrode assembly according to a preferred embodiment of the present invention can be employed.

The following is the description of the preferred embodiments according the present invention. In the drawings, like reference numerals have been used to identify like elements in each figure.

FIG. 1 shows a prism type secondary battery where a roll electrode assembly according to the present invention can be employed.

The battery comprises a roll electrode assembly 2 having a positive electrode, a negative electrode, and a separator disposed between the positive and negative electrodes, a can 4 in which the electrode assembly is inserted with the negative electrode contacted therewith, and a cap assembly 6 coupled to the positive electrode of the roll electrode assembly 2. Internal insulating plates 8 are provided at upper and lower ends of the electrode assembly 2 to prevent the electrode assembly 2 from contacting the cap assembly 6 and the can 4.

The cap assembly 6 is provided with a negative plate 10 which is welded to the upper end of the can 4, a positive plate 12 formed on a central portion of the cap assembly 6, and an external insulating plate 14 disposed between the negative and positive plates 10 and 12. The positive plate 12 is in contact with the positive electrode of the electrode assembly by a tap 18, and supported by a rivet 16 passing through the negative and positive plates. An insulating gasket 20 is disposed between the rivet 16 and the negative plate 10. Electrolyte is injected into the can 4 through an injection hole 22 formed on the negative plate 10. After the electrolyte is injected, the hole 22 is tightly closed by a plug. Safety notches 24 are formed on the negative plate 10 of the cap assembly 6 through a mechanical process, an etching process or an electrofoaming process to prevent the battery explosion by excessively increased internal pressure.

Figure 2:
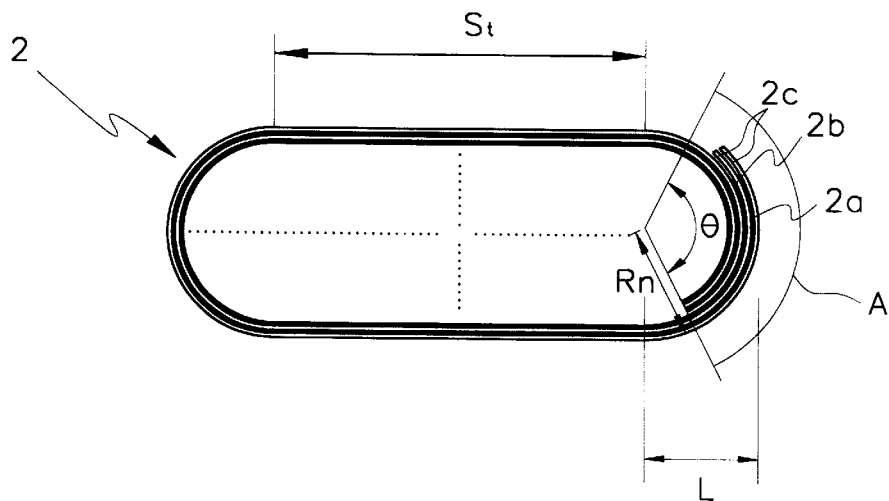
FIG. 2 is a schematic sectional view illustrating a roll electrode assembly according to a preferred embodiment of the present invention.

Referring to FIG. 2, there is shown the inventive roll electrode assembly according to the present invention, which can be used for the above described prism battery.

As shown in FIG. 2, the basic structure of the inventive roll electrode assembly is the same as that of the conventional art. Thus, the detailed description thereof will be omitted herein and the description of the prior art is incorporated as a reference.

Now, major features of the present invention will be described hereinafter with reference to FIG. 3 where the positive electrode 2b is located at the outermost of the roll.

According to an embodiment of the present invention, the thicknesses of each active material applied on opposite surfaces of the positive substrate are the same as each other, while the thicknesses of each active material applied on opposite surfaces of the negative substrate are different from each other.

Figure 3:
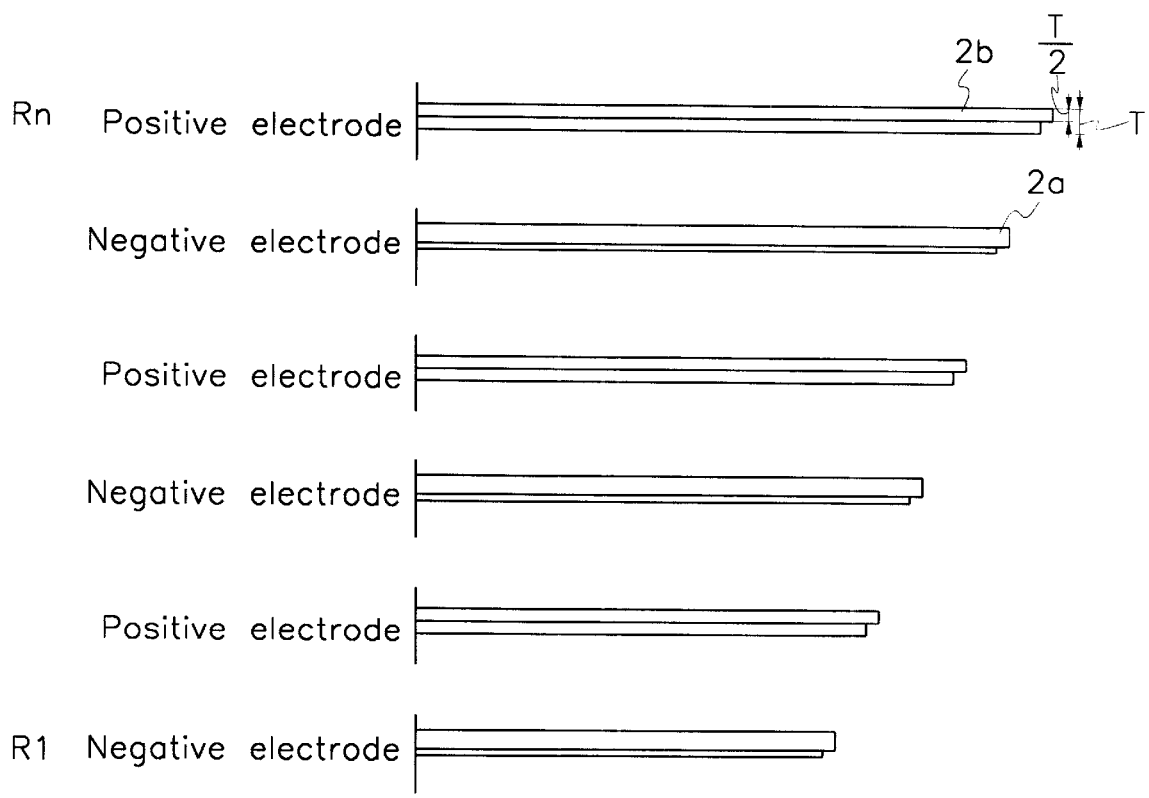
FIG. 3 is a schematic view illustrating length differences between positive and negative electrodes at a portion A of FIG. 2.

That is, as shown in FIG. 3, if the thickness of the active material applied on one surface of the positive substrate is T/2, the thickness of the active material applied on an outer surface of the negative substrate is designed to be higher than T/2 and the thickness of the active material applied on an inner surface of the negative substrate is designed to be less than T/2. Preferably, the thickness difference is controlled within 10%.

Figure 4:
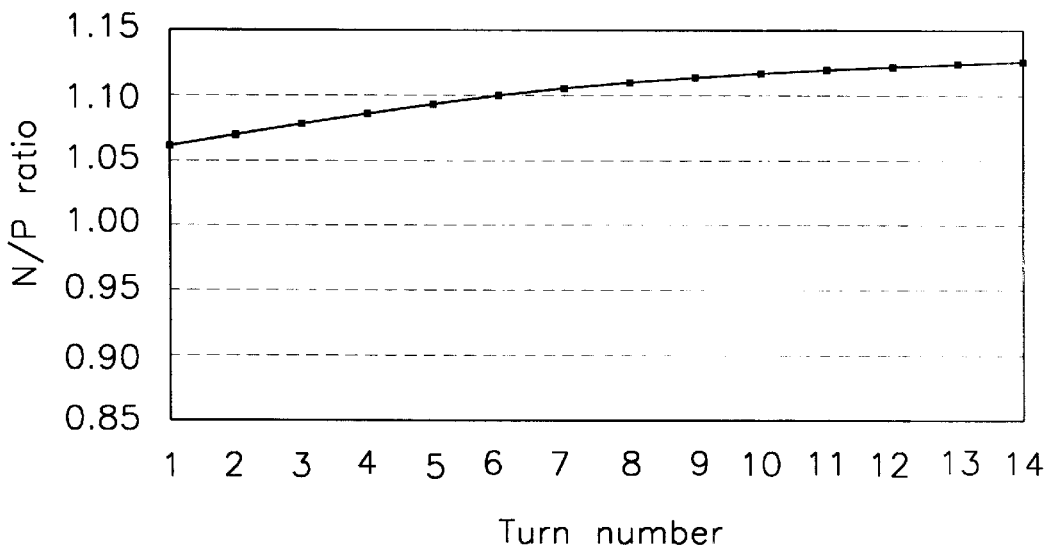
FIG. 4 is a graph illustrating an N/P ratio of a roll electrode assembly according to a preferred embodiment of the present invention when a positive electrode is located at the outermost of the roll.

When calculating the N/P ratio from the above described electrode assembly according to this embodiment, as shown in FIG. 4, the N/P ratio is more than 1 at the innermost turn of the roll electrode assembly and is gradually increased as it goes outward at the curved zone. That is, the N/P ratio is maintained above 1 throughout the whole turns of the roll electrode assembly.

Alternatively, the thicknesses of each active material applied on opposite surfaces of the negative substrate may be the same as each other, while the thicknesses of each active material applied on opposite surfaces of the positive substrate are different from each other.

In this case, the thickness of the active material applied on an inner surface of the positive substrate is designed to be less than T/2 and the thickness of the active material applied on an outer surface of the positive electrode is designed to be equal to T/2. The same effect as when the thickness of the negative electrode is controlled can be obtained. That is, the N/P ratio is maintained above 1 throughout the whole turns of the roll electrode assembly.

Figure 5:
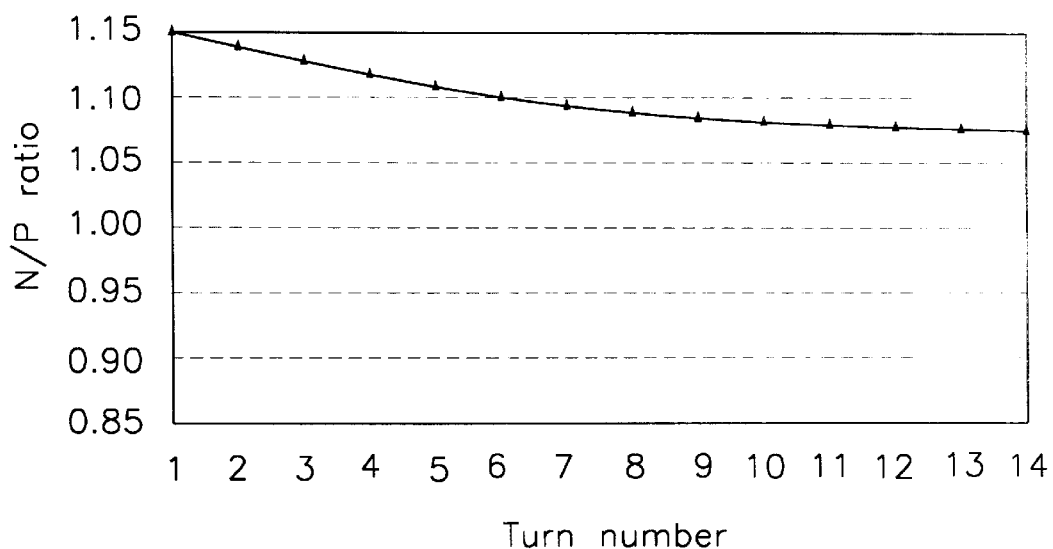
FIG. 5 is a graph illustrating an N/P ratio of a roll electrode assembly according to a preferred embodiment of the present invention when a negative electrode is located at the outermost of the roll.
Figure 6:
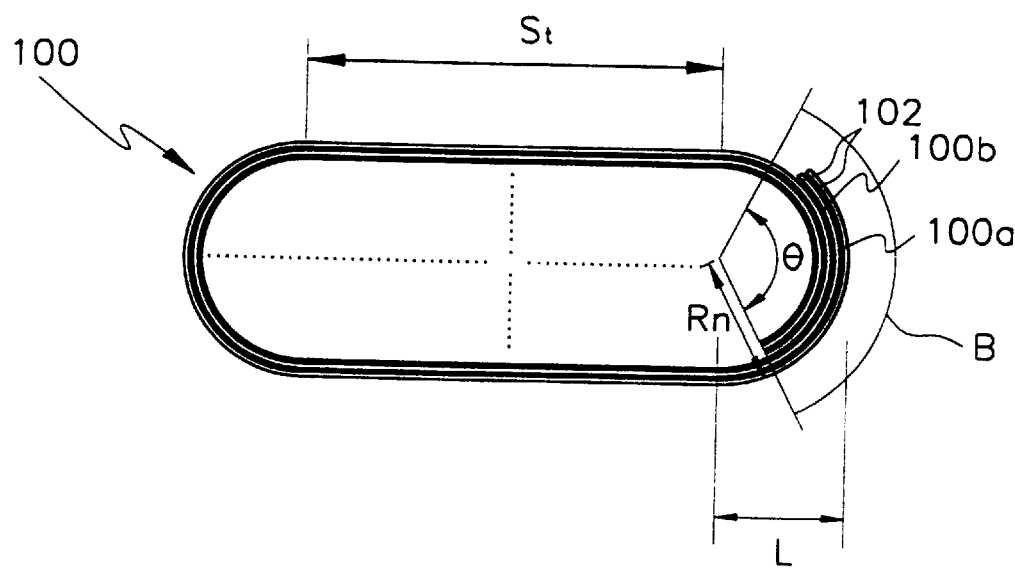
FIG. 6 is a schematic sectional view illustrating a conventional roll electrode assembly of a prism secondary battery.
Figure 7:
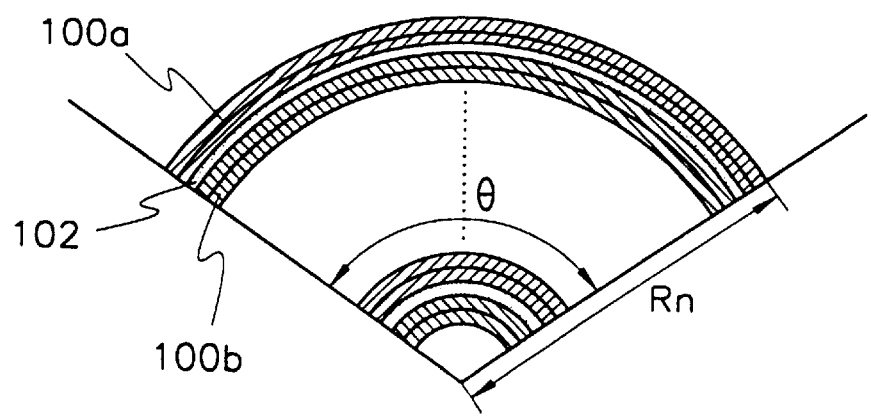
FIG. 7 is an enlarged view illustrating a portion B of FIG. 6.
Figure 8:
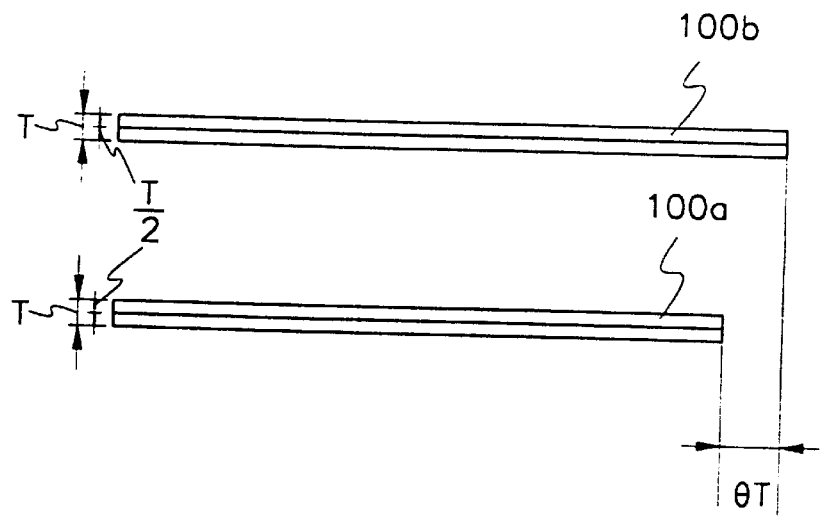
FIG. 8 is a schematic view illustrating the length differences of each of the adjacent electrodes at the portion B of FIG. 6.
Figure 9:
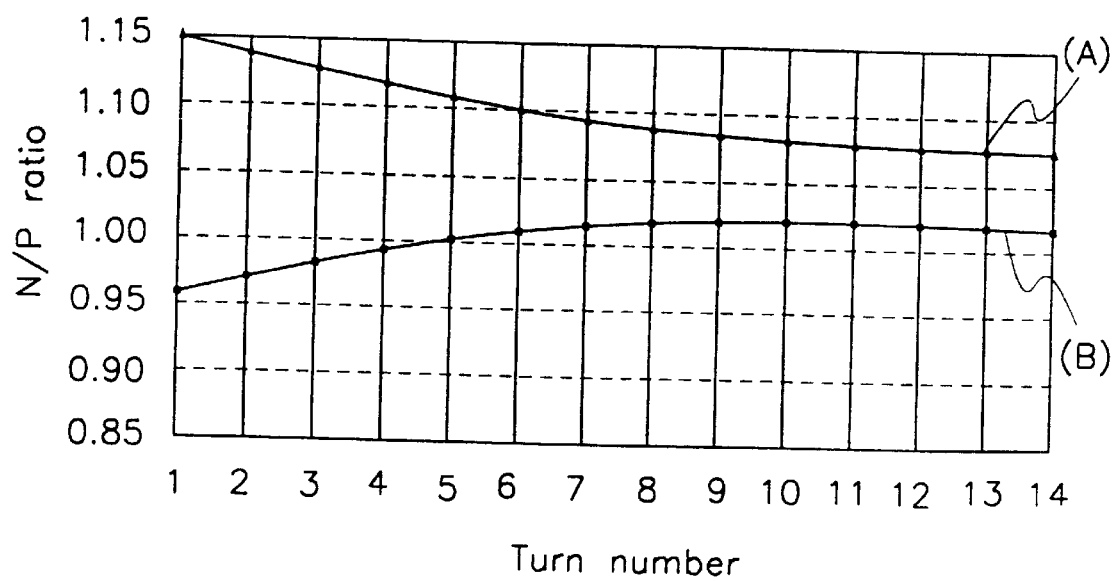
FIG. 9 is a graph illustrating N/P ratio in the conventional roll electrode (A) when a negative electrode is located at the outermost of the roll; and (B) when a positive electrode is located at the outermost of the roll.

When the negative electrode 2a becomes the outermost turn of the electrode assembly, the N/P ratio is maintained above 1 as shown in FIG. 5. That is, the N/P ratio is gradually reduced from the inner side to the outer side of the roll electrode assembly. The N/P ratio is maintained above 1 even at the outermost side of the electrode assembly.

According to another embodiment the present invention, the thickness of the positive and negative active materials applied on the both sides of the positive and negative substrates may be varied so that the N/P ratio of adjacent electrode can be maintained between 1 and 1.2 regardless of what electrode becomes the outermost turn, thereby preventing the N/P ratio from excessively increasing.

The thickness of the active material can be variably applied on the electrode substrate. That is, the active material can be applied on the electrode substrate such that its thickness is varied along the length of the electrode substrate.

While this invention has been described in connection with what is presently considered to be the most practical and preferred embodiments, it is to be understood that the invention is not limited to the disclosed embodiment, but, on the contrary, is intended to cover various modifications and equivalent arrangements and methods included within the spirit and scope of the appended claims.

What is claimed is:

1. A roll electrode assembly used in a secondary battery, comprising:
    a positive electrode substrate arranged as an outermost winding of the roll electrode assembly, applied with a positive active material on both sides, whereby a positive electrode is constructed;
    a negative electrode substrate applied with a negative active material on both sides, whereby a negative electrode is constructed; and
    a separator disposed between said positive and negative electrodes;
    wherein a different thickness of the selected positive and negative active material is applied on opposite sides respectively of the positive substrate and the negative substrate, such that a capacity ratio between the positive and negative electrodes can be maintained above 1.

2. The roll electrode assembly of claim 1, wherein the thickness of the active material applied on an outer side of the negative substrate is thicker than the thickness of the active material applied on an inner side of the negative substrate.

3. The roll electrode assembly of claim 2, wherein the thickness difference is within 10 to 50%.

4. The roll electrode assembly of claim 1, wherein the thickness of the active material applied on an inner side surface of the positive substrate is designed to be less than T/2 and the thickness of the active material applied on an outer side surface of the positive electrode is designed to be equal to T/2.

5. The roll electrode assembly of claim 1, wherein the positive electrode and the negative electrode are rolled to form substantially overlapping sections and the thickness of the active material applied on any one side of either electrode substrate is the same for substantially all the overlapping sections of the positive and negative electrodes.

6. The roll electrode assembly of claim 1, wherein the capacity ratio between the negative active material and the positive active material is more than 1 through the all turns of the electrodes.

* * * * *